United States Patent
Hao

(10) Patent No.: US 11,046,167 B2
(45) Date of Patent: Jun. 29, 2021

(54) HYBRID POWER AND ELECTRIC MOTOR DRIVE TRANSMISSION DEVICE FOR POWER SYSTEM AND OPERATION METHOD THEREFOR

(71) Applicant: eKontrol Co., Ltd., Suzhou (CN)

(72) Inventor: Yun Hao, Suzhou (CN)

(73) Assignee: eKontrol Co., Ltd., Suzhou (CN)

( * ) Notice: Subject to any disclaimer, the term of this patent is extended or adjusted under 35 U.S.C. 154(b) by 0 days.

(21) Appl. No.: 16/497,685

(22) PCT Filed: Mar. 29, 2018

(86) PCT No.: PCT/CN2018/081131
§ 371 (c)(1),
(2) Date: Sep. 25, 2019

(87) PCT Pub. No.: WO2018/177380
PCT Pub. Date: Oct. 4, 2018

(65) Prior Publication Data
US 2021/0053434 A1 Feb. 25, 2021

(30) Foreign Application Priority Data

Mar. 30, 2017 (CN) .......................... 201720363025.7

(51) Int. Cl.
*B60K 6/445* (2007.10)
*B60K 6/365* (2007.10)
(Continued)

(52) U.S. Cl.
CPC .............. *B60K 6/445* (2013.01); *B60K 6/365* (2013.01); *B60K 6/387* (2013.01); *B60K 6/54* (2013.01);
(Continued)

(58) Field of Classification Search
USPC ............................................................ 475/5
See application file for complete search history.

(56) References Cited

U.S. PATENT DOCUMENTS 5,558,589 A * 9/1996 Schmidt ................ B60W 10/08
475/5
5,669,842 A * 9/1997 Schmidt ................ B60K 17/28
475/5
(Continued)

FOREIGN PATENT DOCUMENTS

CN 105480075 A * 4/2016 ............. B60K 3/365
CN 205930236 U * 2/2017 ............. B60K 3/365
(Continued)

OTHER PUBLICATIONS

Machine translation of CN-205930236-U (Year: 2017).*
(Continued)

*Primary Examiner* — Dirk Wright
(74) *Attorney, Agent, or Firm* — Hauptman Ham, LLP

(57) ABSTRACT

A transmission device for a power system, comprising a first electric motor (EM1), a second electric motor (EM2), a single planetary gear train (PG), and a reduction gear transmission mechanism. The transmission device is provided with a brake (B1) and two clutches (C1, C2) and is capable of achieving the electric motor driving mode of two gears and satisfying low-speed high-torque and high-speed usage requirements of electric motor driving. During hybrid power driving, an input power splitting and fixed speed ratio mode is adopted to achieve high-efficient operation of the power system. By removing components such as clutches connected to an engine, the transmission device can also be used as a dual-motor two-gear electric motor drive transmission.

11 Claims, 1 Drawing Sheet

(51) Int. Cl.
     *B60K 6/387*      (2007.10)
     *B60K 6/54*       (2007.10)
     *B60K 6/26*       (2007.10)
     *B60K 6/38*       (2007.10)

(52) U.S. Cl.
     CPC .......... *B60K 6/26* (2013.01); *B60K 2006/381* (2013.01); *B60Y 2200/92* (2013.01)

(56) References Cited

U.S. PATENT DOCUMENTS

| | | | |
|---|---|---|---|
| 5,730,676 A * | 3/1998 | Schmidt | B60W 10/115 475/5 |
| 7,256,510 B2 * | 8/2007 | Holmes | B60W 10/08 290/45 |
| 9,365,102 B2 * | 6/2016 | Kim | B60K 6/383 |
| 9,452,673 B2 * | 9/2016 | Kim | F16H 57/043 |

FOREIGN PATENT DOCUMENTS

| | | | |
|---|---|---|---|
| CN | 206938435 | 1/2018 | |
| WO | WO-2018177380 A1 * | 10/2018 | B60K 6/445 |

OTHER PUBLICATIONS

Machine translation of CN-105480075-A (Year: 2016).*
Machine translation of WO-2018177380-A1 (Year: 2018).*
International search report dated Jul. 2, 2018 from corresponding application No. PCT/CN2018/081131.

* cited by examiner

HYBRID POWER AND ELECTRIC MOTOR DRIVE TRANSMISSION DEVICE FOR POWER SYSTEM AND OPERATION METHOD THEREFOR

RELATED APPLICATIONS

The present application is a National Phase of International Application Number PCT/CN2018/081131, filed Mar. 29, 2018, and claims the priority of China Application No. 201720363025.7, filed Mar. 30, 2017.

TECHNICAL FIELD

The disclosure relates to a vehicle power transmission technology, in particular to a hybrid power transmission device and an electric motor drive transmission device for a power system based on a single planetary gear train structure, and an operation method thereof.

BACKGROUND

As the problems of energy shortage and environmental pollution or the like are more and more serious, various automobile companies are actively committed to the research and development of the automobiles' performance on energy conservation and environmental protection, which mainly focus on the research and development of the internal combustion engine system and the power system, especially the development of new energy power system, so as to effectively solve the problems of automobile energy consumption and environmental pollution.

In the current new energy power system, the layout problem of the transmission device makes it necessary to rely on the driving motors with high power and high torque so as to meet the power demands, thus causing rather high cost of the transmission device.

SUMMARY OF THE INVENTION

In order to solve the above technical problem, the disclosure provides a hybrid power transmission device and an electric motor drive transmission device based on the single planetary gear train structure, which are capable of reducing cost while promoting the power system performance.

The Technical Solution of the Disclosure is as Follows

A hybrid power transmission device for a power system, including a single planetary gear train composed of a sun gear, a planetary gear, a planetary carrier and a gear ring, a first electric motor, a second electric motor and an engine; the first electric motor is in parallel with a first reduction gear pair and a second reduction gear pair, wherein the first reduction gear pair is connected with the sun gear through a sleeve shaft, the second reduction gear pair is connected with a first clutch and controls whether the second reduction gear pair gets involved; the second electric motor is connected with a third reduction gear pair, the gear ring is connected with a connecting shaft, and the second reduction gear pair and the third reduction gear pair are respectively connected with the connecting shaft; the planetary carrier is connected with a brake; by means of passing an input shaft through the sleeve shaft, the engine is connected with the planetary carrier, and an output shaft is connected with the connecting shaft.

Preferably, the single planetary gear train is provided within a box, and the brake is provided on the box for locking the planetary carrier.

Preferably, the first electric motor is connected with a first electric motor shaft, with which the first reduction gear pair and the second reduction gear pair are respectively connected.

Preferably, the first clutch connected with the second reduction gear pair is sleeve-connected with the first electric motor shaft.

Preferably, the second electric motor is connected with the third reduction gear pair through a second electric motor shaft.

Preferably, the engine is connected with a first input shaft, a second clutch is connected between the first input shaft and a second input shaft, and the other end of the second input shaft passes through the sleeve shaft and is connected with the planetary carrier.

An electric motor drive transmission device for a power system, including a single planetary gear train composed of a sun gear, a planetary gear, a planetary carrier and a gear ring, a first electric motor and a second electric motor; the first electric motor is in parallel with a first reduction gear pair and a second reduction gear pair, wherein the first reduction gear pair is connected with the sun gear through a shaft, the second reduction gear pair is connected with a first clutch and controls whether the second reduction gear pair gets involved; the second electric motor is connected with a third reduction gear pair, the gear ring is connected with a connecting shaft, and the second reduction gear pair and the third reduction gear pair are respectively connected with the connecting shaft; the planetary carrier is connected with a brake, and an output shaft is connected with the connecting shaft.

Preferably, the single planetary gear train is provided within a box, and the brake is provided on the box for locking the planetary carrier.

Preferably, the first electric motor is connected with a first electric motor shaft, with which the first reduction gear pair and the second reduction gear pair are respectively connected.

Preferably, the first clutch connected with the second reduction gear pair is sleeve-connected with the first electric motor shaft.

Preferably, the second electric motor is connected with the third reduction gear pair through a second electric motor shaft.

A transmission device for a power system, including:

a single planetary gear train including a sun gear, plural planetary gears surrounding and engaged with the sun gear, a planetary carrier for mounting the planetary gears, and a gear ring simultaneously engaged with the plural planetary gears, wherein the gear ring is coaxially connected with an output shaft; the planetary carrier is connected with a brake;

a first transmission mechanism including a first electric motor connected with a first reduction gear pair and a second reduction gear pair, which are in parallel with each other; the first reduction gear pair is connected with the sun gear, and the second reduction gear pair is connected with the gear ring; wherein a first clutch for controlling the switching of the power is provided between the second reduction gear pair and the first electric motor; and a second transmission mechanism including a second electric motor, and a third reduction gear pair connected with the second electric motor, wherein the third reduction gear pair is connected with the gear ring.

Preferably, the single planetary gear train is provided within a box, and the brake is provided on the box for locking the planetary carrier.

Preferably, the first gear pair includes:

a first reduction gearwheel coaxially connected with the sun gear through a sleeve shaft or directly and coaxially connected with the sun gear;

and a first reduction pinion coaxially connected with the first electric motor shaft of the first electric motor and engaged with the first reduction gearwheel.

Preferably, the second reduction gear pair includes:

a second reduction pinion connected with a first electric motor shaft of the first electric motor through the first clutch;

and a second reduction gearwheel coaxially connected with the gear ring through a connecting shaft and engaged with the second reduction pinion; the connecting shaft being coaxially connected with the output shaft.

Preferably, the second reduction pinion sleeves the first electric motor shaft, and the first electric motor shaft is rotatable relative to the second reduction pinion.

Preferably, the third reduction gear pair includes a third reduction pinion and is connected with a second electric motor shaft of the second electric motor, and the third reduction pinion is engaged with the second reduction gearwheel.

Preferably, the transmission device further includes an engine and a second clutch for controlling the switching of the power between the engine and the planetary carrier; the engine is connected with the second clutch through a first input shaft, and the second clutch is connected with the planetary carrier through the second input shaft.

An operation method for a transmission device for a power system, wherein the transmission device is as afore-mentioned, the operation method including the following steps:

a) the brake is closed and the first reduction gear pair gets involved; the first clutch is opened and the second reduction gear pair does not get involved; the first electric motor works and acts on the output shaft sequentially through the first reduction gear pair, the sun gear, the planetary gear and the gear ring, and the output shaft outputs power, thereby realizing a first transmission mode of the transmission device;

b) the brake is opened and the first reduction gear does not get involved; the first clutch is closed and the second reduction gear pair gets involved; the first electric motor works and acts on the output shaft sequentially through the second reduction gear pair and the gear ring, and the output shaft outputs power, thereby realizing a second transmission mode of the transmission device;

c) the second electric motor works and acts on the output shaft sequentially through the third reduction gear pair and the gear ring, and the output shaft outputs power, thereby realizing a third transmission mode of the transmission device;

d) based on the third transmission mode, a fourth transmission mode is formed by combining with a);

e) based on the third transmission mode, a fifth transmission mode is formed by combining with b).

An operation method for a transmission device for a power system, wherein the transmission device is as afore-mentioned, the operation method including the following steps:

a) the brake is closed and the first reduction gear pair gets involved; the first clutch and the second clutch are opened, and the second reduction gear pair and the engine do not get involved; the first electric motor works and acts on the output shaft sequentially through the first reduction gear pair, the rotation of the sun gear, the planetary gear and the gear ring, and the output shaft outputs power, thereby realizing a first transmission mode of the transmission device;

b) the brake is closed and the first reduction gear pair gets involved; the first clutch and the second clutch are opened, and the second reduction gear pair and the engine do not get involved; the second electric motor works and acts on the output shaft sequentially through the third reduction gear pair and the gear ring, and the output shaft outputs power, thereby realizing a second transmission mode of the transmission device;

c) based on the second transmission mode, a third transmission mode is formed by combining with a);

d) based on the third transmission mode, the brake is opened firstly when the engine accelerates so as to avoid over-high rotation speed of the first electric motor, such that the rotation speed of the first electric motor approaches to that of the second electric motor, and then the first clutch is closed, and an output shaft is driven through the second reduction gear mechanism, thereby forming a fourth transmission mode;

e) the brake and the first clutch are opened, and the second clutch is closed; the first electric motor works and drives the sun gear through the first reduction gear pair; the sun gear transmits power to the engine through the planetary gear and the planetary carrier, thereby driving the engine to start; after the engine is started, the engine respectively drives the gear ring and the sun gear to rotate, and acts on the output shaft through the gear ring, thereby forming a fifth transmission mode;

f) based on the fifth transmission mode, the second electric motor works, and acts on the output shaft sequentially through the third reduction gear pair and the gear ring, and the second electric motor and the engine jointly provide power for the output shaft, thereby forming a sixth transmission mode.

Due to the afore-mentioned technical solution, the disclosure has the following advantages and beneficial effects relative to the prior arts:

The power coupling device adopted by the disclosure is a single planetary gear train mechanism, so the disclosure forms a tri-axial system (a sleeve shaft, a connecting shaft, and an output shaft), wherein the first electric motor and second electric motor are respectively connected with the planetary gear train through the reduction gear pairs. In the disclosure, the first and second clutches adopt a multi-sheet friction element, and the first brake adopts a multi-sheet wet shift element or a one-way clutch mechanism having a two-way locking function.

In the electric motor driving mode, the closing of the first brake is individually controlled so as to realize the electric motor driving mode of the first fixed gear, and the first electric motor or the second electric motor is adopted for driving or both electric motors are adopted for common driving; as the vehicle speed increases, and in order to avoid the over-high rotation speed of the first electric motor, the first brake is controlled to open, the rotation speed of the first electric motor is controlled to approach to that of the second electric motor, and then the second clutch is closed, thereby realizing the fixed speed ratio electric motor driving of the second gear.

In the mode of hybrid power driving, the first clutch is closed so that the power output by the engine is transmitted to the planetary carrier through the input shaft, and the power system at this moment runs in a power splitting working mode, which is a main hybrid power mode. In this mode, the working point of the engine is adjusted by controlling the working rotation speed of the first electric motor, so that the engine can be stabilized in a high efficiency range; the first electric motor at this moment is in a generating state, and the electric energy is stored into battery or is supplied to the second electric motor. The power splitting mode is capable of decoupling the rotation speed of the engine and the vehicle speed, wherein the engine can woke in an optimal range for a long time, and the vehicle continuously variable transmission, i.e. the E-CVT function, can be realized by controlling the rotation speed of the engine, which is also the advantage of the solution of the power splitting hybrid power system.

When the vehicle is running at a high speed by using hybrid power, the engine itself can work in the high efficiency range, and then the second clutch is closed so that the power system can realize a fixed transmission ratio driving mode; the engine at this moment separately drives the vehicle or works together with one or both of the electric motors to drive the vehicle.

Based on the hybrid power transmission device, when the input shaft and the first clutch connected with the engine are removed, it is possible to form an electric motor driving transmission device, which can adjust different speed ratios according to necessities and adopt single- or dual-motor working mode to satisfy different working conditions; besides, during the mass production of products, the components and parts of electric motor drive transmission devices and those of hybrid power transmission devices are highly in common use, as a result, lots of production costs are reduced, which helps to realize the serial development of the products.

According to the afore-mentioned analysis, the hybrid power transmission device provided by the disclosure can realize the two-gear electric motor driving mode and satisfy the use requirements such as low-speed large-torque and high vehicle speed, and is especially suitable for the plug-in hybrid power system; in the hybrid power driving mode, the power splitting mode is adopted at medium and low speed so as to realize fine fuel efficiency; the fixed speed ratio driving mode is adopted at high vehicle speed so as to make the best of the high efficiency running range of the engine itself; the electric motor drive transmission device provided by the disclosure can be applied to the two-gear electric motor drive gearbox, and, in the view of the hybrid power transmission device and the electric motor drive transmission device, product platformization and serialization can be realized.

Moreover, the transmission device provided by the disclosure has a simple structure, and does not need a driving electric motor with large power and high torque to satisfy the power requirements, thereby reducing the cost of the transmission device.

DESCRIPTION OF THE DRAWINGS

With reference to the drawings and the elaboration below, the afore-mentioned and other characteristics and advantages of the disclosure can be better understood. Wherein.

Figure 1:
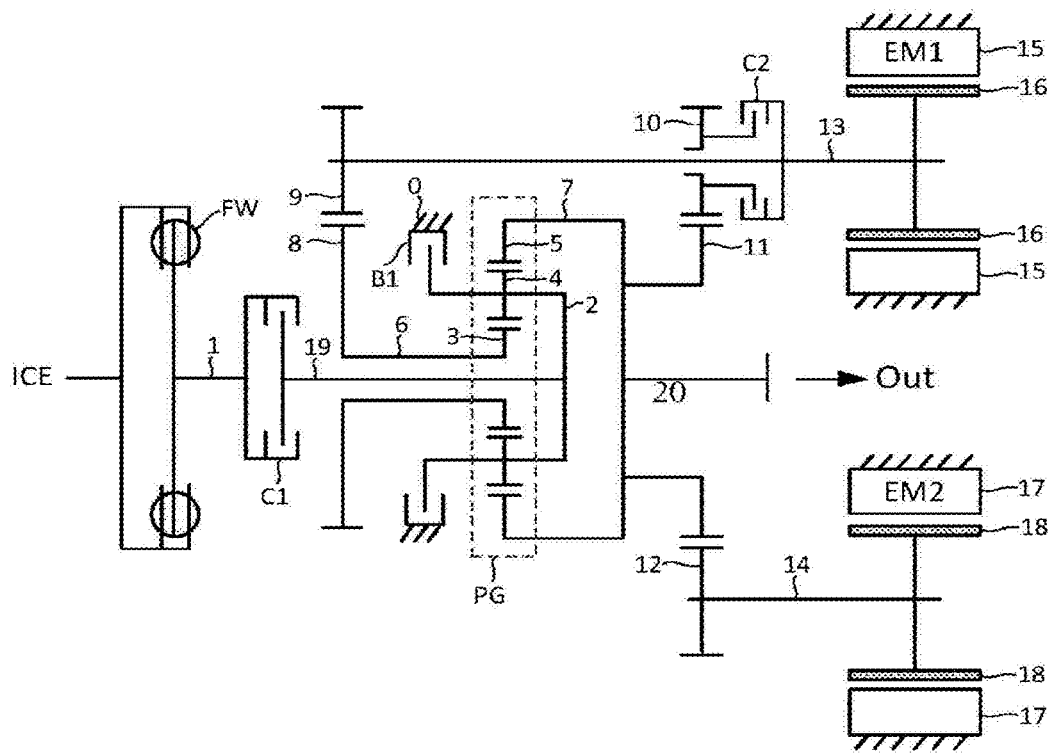
FIG. 1 is a principle and structure diagram of a hybrid power transmission device disclosed in Example 1 of the disclosure.

Names of corresponding components represented by the numbers and letters in the drawings:

1. First input shaft; 2. Planetary carrier; 3. Sun gear; 4. Planetary gear; 5. Gear ring; 6. Sleeve shaft (shaft); 7. Connecting shaft; 8. First reduction gearwheel; 9. First reduction pinion; 10. Second reduction pinion; 11. Second reduction gearwheel; 12. Third reduction pinion; 13. First electric motor shaft; 14. Second electric motor shaft; 15. First electric motor stator; 16. First electric motor rotor; 17. Second electric motor stator; 18. Second electric motor rotor; 19. Second input shaft; 20. Output shaft.

EMBODIMENTS

With reference to the drawings showing the examples of the disclosure, more details of the disclosure will be illustrated below. However, the disclosure can be realized in many different ways, and the examples described should not be understood as limits for the disclosure. On the contrary, these examples are raised to realize sufficient and complete disclosure, and to enable one skilled in this technical field to completely understand the scope of the disclosure. For the purpose of being clear, some of these drawings may have magnified sizes and relative sizes of the layers and areas.

EXAMPLE 1

As shown in FIG. 1, the disclosure provides a hybrid power transmission device including a single planetary gear train PG, an engine, a first transmission mechanism and a second transmission mechanism. Wherein: the single planetary gear train PG includes a sun gear 3, planetary gears 4, a planetary carrier 2 and a gear ring 5, plural planetary gears 4 are circumferentially arranged around and are engaged with the sun gear 3, the gear ring 5 is provided to surround the plural planetary gears 4 and is simultaneously engaged with the plural planetary gears, and the gear ring is directly or indirectly and coaxially connected with an output shaft 20.

In this example, the first transmission mechanism includes a first electric motor EM1 composed of a first electric motor stator 15, a first electric motor rotor 16 and a first electric motor shaft 13, a first reduction gear pair directly connected to the first electric motor shaft 13, and a second reduction gear pair provided on the first electric motor shaft 13 through a first clutch C2, the first reduction gear pair and the second gear pair being in parallel; the first clutch C2 is configured to control whether the second reduction gear is connected with the first electric motor shaft 13, and whether the first electric motor shaft 13 drives the second reduction gear pair. Wherein: the first reduction gear pair is connected with the sun gear 3, and the second reduction gear pair is connected with the gear ring 5.

In this example, the first reduction gear pair includes a first reduction gearwheel 8 and a first reduction pinion 9, the first reduction pinion 9 is coaxially and fixedly connected with the first electric motor shaft 13, the first reduction gearwheel 8 is coaxially and fixedly connected with the sun gear 3, and the first reduction gearwheel 8 is engaged with the first reduction pinion 9; the first electric motor EM1 is started and drives the first reduction pinion 9 to rotate through the first electric motor shaft 13, and the first reduction pinion 9 rotates and acts on the sun gear 3 through the first reduction gearwheel 8; the first reduction gearwheel 8 is coaxially and fixedly connected with the sun gear 3 through a sleeve shaft 6.

Further, in order to control the involvement of the first reduction gear pair into the single planetary gear train, a brake B1 is connected onto the planetary carrier 2; specifically, in real process, the transmission device has a box 0, and the brake B1 is mounted between the planetary carrier 2 and the box 0.

In this example, the second reduction gear pair includes a second reduction pinion 10 and a second reduction gearwheel 11; the second reduction pinion 10 is connected with the first electric motor shaft 13 through the first clutch C2 configured to control whether the second reduction gear pair gets involved into the single planetary gear train; the second reduction pinion 10 sleeves the first electric motor shaft 13, which is rotatable relative to the second reduction pinion 10; the second reduction gearwheel 11 is coaxially and fixedly connected with the gear ring 7; when the first clutch C2 is closed, the first electric motor shaft 13 rotates and drives the second reduction pinion 10 to rotate, and the second reduction pinion 10 rotates and then acts on the gear ring 5 through the second reduction gearwheel. Wherein: the second reduction gearwheel 11 is coaxially and fixedly connected with the gear ring 5 through a connecting shaft 7, and an output shaft 20 of the transmission device is directly, coaxially and fixedly connected with the connecting shaft 7.

In this example, the second transmission mechanism includes a second electric motor EM2 composed of a second electric motor stator 17, a second electric motor rotor 18 and a second electric motor shaft 14, and a third reduction gear pair provided on the second electric motor shaft 14, wherein the third reduction gear pair is connected with the gear ring 5, and can rotate and act on the gear ring 5.

Further, the third reduction gear pair includes a third reduction pinion 12. In this example, the third reduction pinion 12 is directly engaged with the second reduction gearwheel 11; the second electric motor EM2 works and drives the second electric motor shaft 14 to rotate, thereby driving the third reduction pinion 12 to rotate; the third reduction pinion 12 rotates and acts on the gear ring 5 through the second reduction gearwheel 11.

In this example, the engine is fixedly connected with the planetary carrier 2 through a second clutch C1; specifically, a flywheel shock absorber FW of the engine is connected with a first input shaft 1 connected with a second input shaft 19 through the second clutch C2, the second input shaft 19 being coaxially and fixedly connected with the planetary carrier 2; it should be noted that, since the first reduction gearwheel 8 is connected with the sun gear 3 through the sleeve shaft 6, and in order to connect the second input shaft 19 with the planetary carrier 2, the sleeve shaft 6 in this example is designed to be a hollowed shaft and can be connected with the planetary carrier 2 by passing the second input shaft 19 through the sleeve shaft 6.

In this example, the first clutch C2 and the second clutch C1 adopt a multi-sheet friction element, and the brake B1 adopts a multi-sheet friction element or a one-way clutch mechanism having a two-way locking function. In this example, the multi-sheet friction element is selected because of its strong surface pressure and its capability of producing more torques; of course, the realization of the first clutch C2, the second clutch C1 and the brake B1 in other examples is not limited as above, and can be adjusted according to specific circumstances.

The transmission device provided in this example adopts the single planetary gear train as a power coupling mechanism for realizing the power coupling of the engine, the first electric motor and the second electric motor. In real driving process of vehicles, each of the power sources and shift elements (the first clutch, the second clutch and the brake) are used in combination, and can produce many different working modes; moreover, the disclosure merely needs one single planetary gear train to realize the transmission ratio that can be reached by the double planetary gear trains in the prior art, and the transmission device has a simple structure and an optimal transmission path, and can satisfy the arrangement of vehicle space, thereby simplifying the process.

besides, the first electric motor and the second electric motor of the disclosure use the primary gear transmission for speed cutting and torque increasing, and, in the electric motor driving mode, can reach the power performances of large electric motors by using electric motors with comparatively small torque, thereby optimizing the high efficiency range of the electric motor working, and further reducing the size, weight and cost of the whole electric driving system; furthermore, the grade ability and the acceleration ability are far better than single large electric motors;

| Working Mode | Brake | First Clutch | Second Clutch | Mechanical Transmission Path |
| --- | --- | --- | --- | --- |
| Electric motor mode 1 | • | ○ | ○ | First electric motor → First reduction gear pair → Planetary gear train → Output shaft<br>Second electric motor → Third reduction gear pair → Planetary gear train → Output shaft |
| Electric motor mode 2 | ○ | ○ | • | First electric motor → Second reduction gear pair → Planetary gear train → Output shaft<br>Second electric motor → Third reduction gear pair → Planetary gear train → Output shaft |
| Hybrid power mode 1 | ○ | • | ○ | Engine → Planetary gear train → Output shaft<br>Second electric motor → Third reduction gear pair → Planetary gear train → Output shaft |
| Hybrid power mode 2 | ○ | • | • | Engine → Planetary gear train → Output shaft<br>First electric motor → Second reduction gear pair → Planetary gear train → Output shaft<br>Second electric motor → Third reduction gear pair → Planetary gear train → Output |

| Working Mode | Brake | First Clutch | Second Clutch | Mechanical Transmission Path |
|---|---|---|---|---|
| | | | | shaft |

Note:
o represents the opening state;
• represents the closing state

Based on the table above, the working modes of the transmission device provided in this example are further explained as follows.

I. Electric Motor Driving Mode

In the electric motor driving mode, according to Table 1, the brake B1 is closed, and the first clutch C2 and the second clutch C1 are opened:

(i) if the first electric motor works independently, it is capable of driving the first electric motor shaft 13 to rotate and driving the first reduction gear pair to rotate through the first electric motor shaft 13, thereby transmitting the power to the sleeve shaft 6; since the sleeve shaft 6 is connected with the sun gear 3, the power is transmitted to the sun gear 3 through the sleeve shaft 6; since the brake B1 is connected with the planetary carrier 2, the brake B1 can be used for locking the planetary carrier 2, the power is thus transmitted to the gear ring 5, further to the connecting shaft 7 connected with the gear ring 5, and to the output shaft connected to the connecting shaft 7 through the connecting shaft 7;

(ii) if the second electric motor works independently, it is capable of driving the second electric motor shaft 14 to rotate, and transmitting the power to the third reduction pinion 12 through the second electric motor shaft 14 and further to the second reduction gearwheel 11 engaged with the third reduction pinion 12; since the connecting shaft 7 is connected with the second reduction gearwheel 11, the power can be transmitted to the connecting shaft 7, and to the output shaft 20 through the connecting shaft 7;

(iii) in the combination of the two situations (i) and (ii), if the first electric motor and the second electric motor work together, it is possible to drive the connecting shaft 7 to rotate, and further to drive the output shaft to rotate.

In any of the afore-mentioned three situations, it is possible to form a first fixed transmission ratio and form the Electric motor mode 1. It should be noted that, when the first electric motor and the second electric motor work simultaneously, a comparatively large driving torque can be output, and the power requirements for electric motor driving can be sufficiently satisfied.

When the first electric motor and the second electric motor work simultaneously, as the vehicle speed increases, in order to avoid over-high rotation speed of the first electric motor, the brake B1 will be opened at that time to adjust the rotation speed of the first electric motor so that the rotation speed of the first electric motor gets approaches or is equal to that of the second electric motor, and then closes the first clutch C1, at this moment, the first electric motor is capable of driving the second reduction gear pair to rotate through the first electric motor shaft 13, and thus driving the connecting shaft 7 to rotate; the connecting shaft 7 transmits the power to the output shaft, and then a second fixed transmission ratio can be formed.

Besides, the transmission ratio of the first reduction gear pair is set to be the same as that of the second reduction gear pair, as a result, when the first clutch C2 is closed, the sun gear 3 and the gear ring 5 will rotate at the same speed, and there will be no relative rotation speed among the elements of the planetary gear train, by means of which mechanical losses of planetary gear train running can be reduced.

II. Hybrid Power Driving Mode

In the hybrid power driving mode, with reference to the above table, the brake B1 and the first clutch C2 are opened, and the second clutch C1 is closed; when the first electric motor works, it can drive the first electric motor shaft 13 to rotate, and drives the first reduction gear pair to rotate; the first reduction gear pair can transmit the power to the sun gear 3; since the brake is opened and the second clutch C1 is closed, the sun gear 3 will transmit the power to the planetary gear 4, and further to the engine through the planetary carrier 2, thereby driving the engine to start; meanwhile, the working point of the engine is adjusted to decoupling the rotation speed of the engine and the vehicle speed.

when the engine is working, the power can be transmitted to the second input shaft 19 through the first input shaft 1; since the brake B1 is opened, and the second input shaft 19 is connected with the planetary carrier 2, the second input shaft 19 can be used for driving the gear ring 5 and the sun gear 3 to rotate respectively, and the rotation of the gear ring 5 can drive the connecting shaft 7 to rotate, thereby rotating the output shaft 20.

It should be noted that, when the engine works, it drives the sun gear 3 to rotate, and drives the first electric motor shaft 13 to rotate through the first reduction gear pair; at this moment, the first electric motor can get a part of power from the engine, is in a generating state, and can store the electric energy into battery or supply the electric energy to the second electric motor for use, thereby forming a complete transmission path of electric power; remaining power of the engine is transmitted to the output shaft through the mechanical path of the planetary gear train mechanism.

By driving the second electric motor shaft 14, the second electric motor can drive the third reduction gear pair to rotate, and drive the connecting shaft 7 to rotate, thereby transmitting the power to the output shaft 20 and providing the power output together with the engine.

In this mode, the output power of the engine is transmitted through the electric power transmission path and the mechanical transmission path, thereby realizing the power splitting working mode, which optimizes the working range of the engine, benefits the entire power system and has good fuel economy.

When the vehicle drives at a high speed, since the engine itself can work at the high efficiency range, the first clutch C2 and the second clutch C1 are closed at that time, and the brake B1 is opened, so the power system can realize the fixed transmission ratio driving mode, which is to drive independently by using the engine, or to drive jointly by the engine and the first electric motor, or to drive jointly by the engine and the second electric motor, or to drive jointly by the engine, the first electric motor and the second electric motor. In other words, the fixed transmission ratio driving mode can be formed.

According to the above elaboration, the transmission device provided by the disclosure can intelligently switch among different running modes according to various working conditions of the vehicle, and can ensure the economical efficiency and the emission performance of the vehicle on the condition of satisfying the vehicle driving requirements; the engine keeps running in a highly efficient state all the time, and the economical efficiency and the emission performance of the vehicle are in the best condition; in the starting phase, the vehicle travels in the mode of dual-motor electric motor driving; in the low-speed phase, the vehicle is driven in the mode of dual-motor electric motor driving; in the medium- and low-speed phase, the vehicle travels in the mode of planetary gear train hybrid power driving; in the high-speed phase, the vehicle is in a parallel hybrid power driving mode; in the idling phase, the engine stops; and in the braking phase, the energy feedback starts.

EXAMPLE 2

Figure 2:
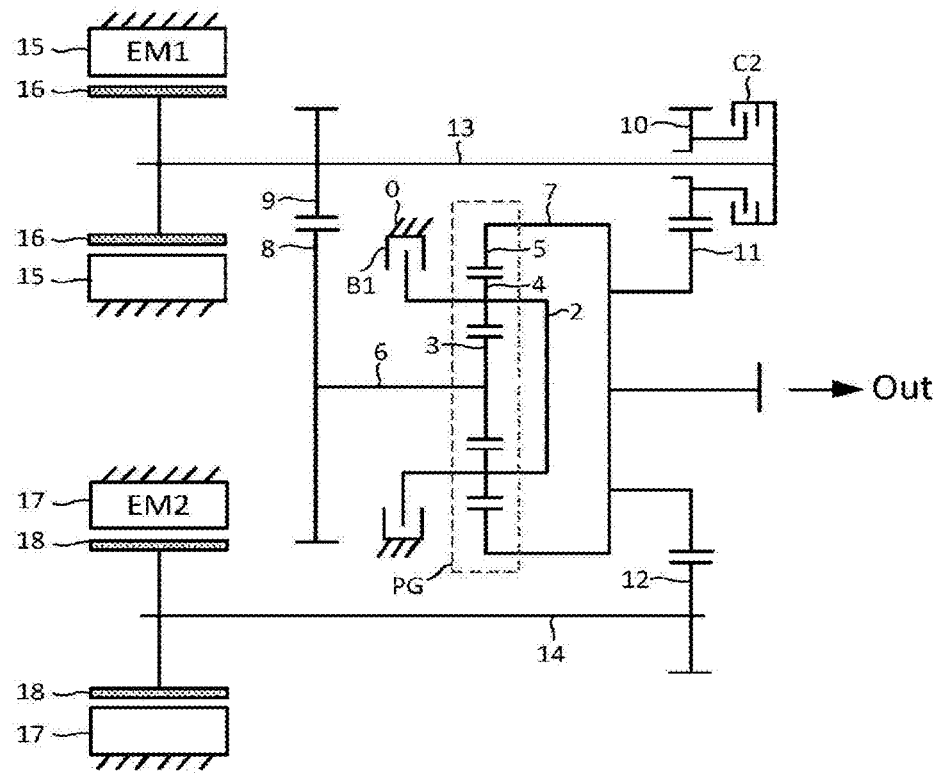
FIG. 2 is a principle and structure diagram of an electric motor drive transmission device disclosed in Example 2 of the disclosure.

As shown in FIG. 2, this example provides an electric motor drive transmission device including a single planetary gear train PG, a first transmission mechanism and a second transmission mechanism. Wherein: the single planetary gear train PG includes a sun gear 3, planetary gears 4, a planetary carrier 2 and a gear ring 5, plural planetary gears 4 are circumferentially arranged around and are engaged with the sun gear 3, the gear ring 5 is provided to surround the plural planetary gears 4 and is simultaneously engaged with the plural planetary gears, and the gear ring is directly or indirectly and coaxially connected with an output shaft 20.

In this example, the first transmission mechanism includes a first electric motor EM1 composed of a first electric motor stator 15, a first electric motor rotor 16 and a first electric motor shaft 13, a first reduction gear pair directly connected to the first electric motor shaft 13, and a second reduction gear pair provided on the first electric motor shaft 13 through a first clutch C2, the first reduction gear pair and the second gear pair being in parallel; the first clutch C2 is configured to control whether the second reduction gear is connected with the first electric motor shaft 13, that is, to control whether the first electric motor shaft 13 drives the second reduction gear pair. Wherein: the first reduction gear pair is connected with the sun gear 3, and the second reduction gear pair is connected with the gear ring 5.

In this example, the first reduction gear pair includes a first reduction gearwheel 8 and a first reduction pinion 9, the first reduction pinion 9 is coaxially and fixedly connected with the first electric motor shaft 13, the first reduction gearwheel 8 is directly, coaxially and fixedly connected with the sun gear 3, and the first reduction gearwheel 8 is engaged with the first reduction pinion 9; the first electric motor EM1 is started and drives the first reduction pinion 9 to rotate through the first electric motor shaft 13, and the first reduction pinion 9 rotates and acts on the sun gear 3 through the first reduction gearwheel 8.

Further, in order to control the involvement of the first reduction gear pair into the single planetary gear train, a brake B1 is connected onto the planetary carrier 2; specifically, in real process, the transmission device has a box 0, and the brake B1 is mounted between the planetary carrier 2 and the box 0.

In this example, the second reduction gear pair includes a second reduction pinion 10 and a second reduction gearwheel 11; the second reduction pinion 10 is connected with the first electric motor shaft 13 through the first clutch C2 configured to control whether the second reduction gear pair gets involved into the single planetary gear train; the second reduction pinion 10 sleeves the first electric motor shaft 13, which is rotatable relative to the second reduction pinion 10; the second reduction gearwheel 11 is coaxially and fixedly connected with the gear ring 7; after the first clutch C2 is closed, the first electric motor shaft 13 rotates and drives the second reduction pinion 10 to rotate, and the second reduction pinion 10 rotates and then acts on the gear ring 5 through the second reduction gearwheel. Wherein: the second reduction gearwheel 11 is coaxially and fixedly connected with the gear ring 5 through a connecting shaft 7, and an output shaft 20 of the transmission device is directly, coaxially and fixedly connected with the connecting shaft 7.

In this example, the second transmission mechanism includes a second electric motor EM2 composed of a second electric motor stator 17, a second electric motor rotor 18 and a second electric motor shaft 14, and a third reduction gear pair provided on the second electric motor shaft 14, wherein the third reduction gear pair is connected with the gear ring 5, and can rotate and act on the gear ring 5.

Further, the third reduction gear pair includes a third reduction pinion 12. In this example, the third reduction pinion 12 is directly engaged with the second reduction gearwheel 11; the second electric motor EM2 works and drives the second electric motor shaft 14 to rotate, thereby driving the third reduction pinion 12 to rotate; the third reduction pinion 12 rotates and acts on the gear ring 5 through the second reduction gearwheel 11.

The electric motor drive transmission device in this example has the following working modes:

(i) the brake is closed and the second clutch is opened; the first electric motor works and drives the first reduction pinion 9 to rotate by driving the first electric motor shaft 13 to rotate; the first reduction gearwheel 8 engaged with the first reduction pinion 9 can rotate, and drives the sun gear 3 to rotate through the rotation of the shaft; since the brake is closed, the rotation of the sun gear 3 can drive the gear ring 5 to rotate, and further enable the connecting shaft 7 connected with the gear ring 5 to rotate, thereby outputting the power through the output shaft;

(ii) the brake is opened and the second clutch is closed; the first electric motor works and can drive the second reduction pinion 10 to rotate by driving the first electric motor shaft 13 to rotate; the second reduction gearwheel 11 engaged with the second reduction pinion 10 can rotate, and can drive the rotation of the connecting shaft 7 connected with the second reduction gearwheel 11, thereby outputting the power through the output shaft 20;

(iii) when the second electric motor works, it drives the second electric motor shaft 14 to rotate, and drives the rotation of the third reduction pinion 12 connected with the second electric motor shaft 14, and further drives the rotation of the second reduction gearwheel 11 engaged with the third reduction pinion 12; since the second reduction gearwheel 11 is connected with the connecting shaft 7, the connecting shaft 7 is driven to rotate, thereby outputting the power through the output shaft 20;

(iv) based on (iii), any way of combination with (i) or (ii) can realize dual-motor synchronous driving, output a comparatively large driving torque and satisfy the power requirements of electric motor driving.

To sum up, the hybrid power transmission device provided by the disclosure can reduce the demands on the electric motor and satisfy the use requirements such as low-speed large-torque and high vehicle speed, and is especially suitable for the plug-in hybrid power system. In the hybrid power driving mode, the power splitting mode is adopted at medium and low speed so as to realize fine fuel efficiency; the fixed speed ratio driving mode is adopted at the high vehicle speed so as to make the best of the high efficiency running range of the engine itself.

During the mass production of products, the components and parts of electric motor drive transmission devices and those of hybrid power transmission devices are highly in common use, as a result, lots of production costs are reduced, which helps to realize the serial development of the products.

One skilled in this technical field should understand that the disclosure can be realized in many other specific ways without going beyond its spirits or scope. Although the examples of the disclosure are described, it should be understood that the disclosure is not limited to these examples, and one skilled in this technical field can make changes and alternations within the spirits and scope of the disclosure as limited in the claims attached.

What is claimed is:

1. A hybrid power transmission device for a power system, comprising: a single planetary gear train composed of a sun gear, a planetary gear, a planetary carrier and a gear ring, a first electric motor, a second electric motor and an engine; the first electric motor is in parallel with a first reduction gear pair and a second reduction gear pair, wherein the first reduction gear pair is connected with the sun gear through a sleeve shaft, the second reduction gear pair is connected with a first clutch and controls whether the second reduction gear pair is connected to a first motor shaft; the second electric motor is connected with a third reduction gear pair, the gear ring is connected with a connecting shaft, and the second reduction gear pair and the third reduction gear pair are respectively connected with the connecting shaft; the planetary carrier is connected with a brake; the engine is connected with the planetary carrier by passing an input shaft through the sleeve shaft, and an output shaft is connected with the connecting shaft.

2. The hybrid power transmission device for a power system according to claim 1, wherein: the single planetary gear train is provided within a box, and the brake is provided on the box for locking the planetary carrier.

3. The hybrid power transmission device for a power system according to claim 1, wherein: the first electric motor is connected with a first electric motor shaft, with which the first reduction gear pair and the second reduction gear pair are respectively connected.

4. The hybrid power transmission device for a power system according to claim 3, wherein: the first clutch connected with the second reduction gear pair is sleeve-connected with the first electric motor shaft.

5. The hybrid power transmission device for a power system according to claim 1, wherein: the second electric motor is connected with the third reduction gear pair through a second electric motor shaft.

6. The hybrid power transmission device for a power system according to claim 1, wherein: the engine is connected with a first input shaft, a second clutch is connected between the first input shaft and a first end of a second input shaft, and a second end of the second input shaft passes through the sleeve shaft and is connected with the planetary carrier.

7. An electric motor drive transmission device for a power system, comprising: a single planetary gear train composed of a sun gear, a planetary gear, a planetary carrier and a gear ring, a first electric motor and a second electric motor; the first electric motor is in parallel with a first reduction gear pair and a second reduction gear pair, wherein the first reduction gear pair is connected with the sun gear through a shaft, the second reduction gear pair is connected with a first clutch and controls whether the second reduction gear pair is connected to a first motor shaft; the second electric motor is connected with a third reduction gear pair, the gear ring is connected with a connecting shaft, and the second reduction gear pair and the third reduction gear pair are respectively connected with the connecting shaft; the planetary carrier is connected with a brake, and an output shaft is connected with the connecting shaft.

8. The electric motor drive transmission device for a power system according to claim 7, wherein: the first electric motor is connected with a first electric motor shaft, with which the first reduction gear pair and the second reduction gear pair are respectively connected.

9. The electric motor drive transmission device for a power system according to claim 8, wherein: the first clutch connected with the second reduction gear pair is sleeve-connected with the first electric motor shaft.

10. The electric motor drive transmission device for a power system according to claim 7, wherein: the second electric motor is connected with the third reduction gear pair through a second electric motor shaft.

11. The transmission device for a power system according to claim 7, wherein: the transmission device further includes an engine and a second clutch for controlling the switching of the power between the engine and the planetary carrier; the engine is connected with the second clutch through a first input shaft, and the second clutch is connected with the planetary carrier through the second input shaft.

* * * * *